United States Patent [19]

Weddigen et al.

[11] Patent Number: 4,670,511

[45] Date of Patent: Jun. 2, 1987

[54] METHOD FOR PRODUCING A PLASTIC

[75] Inventors: Gert Weddigen, Heidelberg; Josef Flatz, Waldmichelbach; Conrad Schmidt, Gaiberg; Robert Huber, Ketsch; Gerhard Pohsner, Speyer, all of Fed. Rep. of Germany

[73] Assignee: Brown, Boveri & CIE AG, Mannheim, Fed. Rep. of Germany

[21] Appl. No.: 834,642

[22] Filed: Feb. 26, 1986

[30] Foreign Application Priority Data

Oct. 13, 1983 [DE] Fed. Rep. of Germany ....... 3337245

[51] Int. Cl.[4] .................................................. C08F 8/00

[52] U.S. Cl. .................................... 525/138; 525/201; 525/202; 525/456; 525/465; 525/480; 525/481; 525/490; 525/504; 525/505; 525/506

[58] Field of Search ............... 525/201, 202, 398, 402, 525/138, 456, 465, 480, 481, 490, 504, 505, 506

[56] References Cited

U.S. PATENT DOCUMENTS 4,397,971 8/1983 Hocker et al. ....................... 525/202

4,481,312 11/1984 Hocker et al. ....................... 525/202

*Primary Examiner*—Joseph L. Schuster

*Assistant Examiner*—Bernard Lipman

*Attorney, Agent, or Firm*—Herbert L. Lerner; Laurence A. Greenberg

[57] ABSTRACT

Method for manufacturing a conductive plastic of a defined conductivity by forming a polymer alloy. A polar or nonpolar insulating polymer and a polar or nonpolar conductive polymer are used for forming the polymer alloy. The two polymers are mixed together and they are homogeneously distributed within the polymer alloy.

8 Claims, No Drawings

METHOD FOR PRODUCING A PLASTIC

This application is a continuation of application Ser. No. 659,655 filed Oct. 11, 1984, now abandoned.

BACKGROUND OF THE INVENTION

1. Field of the Invention

The invention relates to a method for producing a plastic which has a defined electric conductivity.

2. Description of the Prior Art

Plastics with a defined electric conductivity are particularly adapted for the manufacture of housings and protective coatings of electrical equipment as well as for covering veneer elements for walls and furniture.

In electrotechnology there is a great demand for polymers, the electric conductivity of which, referred to the cross section of the plastic within a range in which the plastic still acts as an insulator, can be freely chosen between $10^{-14}$ and $10^{-7}$(ohm×cm)$^{-1}$. With such plastics it is possible to maintain an adequate insulating effect while at the same time avoiding electrostatic charges. In contrast thereto, commercially available plastics have only an electric bulk conductivity of $10^{-15}$ to $10^{-18}$ (ohm×cm)$^{-1}$.

British Pat. No. 10 67 260 discloses an electrically conductive synthetic polymer. This is a nitrogen-containing polymer, in which the electric conductivity is obtained by the formation of charge-transfer complexes. The conductivity of this plastic is higher than that of the commercially available plastics, but a conductivity in the desired above-mentioned range cannot yet be achieved there. This plastic, furthermore, is not suitable for further processing since it is neither soluble nor meltable.

SUMMARY OF THE INVENTION

It is therefore and object of the invention to provide a method for producing a plastic which can be used for further processing, particularly for injection molding and casting, and the conductivity of which can be adjusted to a defined value.

With the foregoing and other objects in view, there is provided in accordance with the invention a method for producing a meltable polymer alloy which has a defined conductivity between $10^{-14}$ and $10^{-7}$ (ohm×cm)$^{-1}$, which comprises, forming a molecular mixture of at least one polar insulating polymer selected from the group consisting of polyvinyl chloride, polybutylene terephthalate, epoxy resin, polycarbonate, polyurethane resin and polyamide and a polar conductive polymer in the form of a synthetic polymer with triaromatic methane units as basic building blocks, said polymer selected from the group consisting of a polymer formed by polycondensation of bisphenol-A,

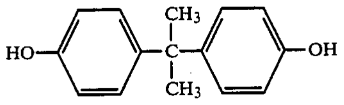

and 4-dimethylaminobenzaldehyde

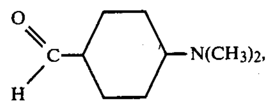

by polycondensation of bisphenol-A and para-anisaldehyde

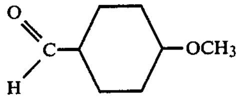

and by polycondensation of benzaldehyde and resorcinol, said polymer doped with a member of the group consisting of electron donors and electron acceptors to form the meltable polymer alloy of the defined conductivity of $10^{-14}$ through $10^{-7}$ (ohm×cm)$^{-1}$.

In accordance with a further feature of the invention there is provided a method for producing a meltable polymer alloy which has a defined conductivity between $10^{-14}$ and $10^{-7}$ (ohm×cm)$^{-1}$, which comprises, forming a molecular mixture of at least one nonpolar insulating polymer selected from the group consisting of polyethylene, polybutadiene, polystyrene, butadiene styrene copolymers and acrylonitrile butadiene styrene copolymers and a polar conductive polymer in the form of a synthetic polymer with triaromatic methane units as basic building blocks, said polymer selected from the group consisting of a polymer formed by polycondensation of bisphenol-A,

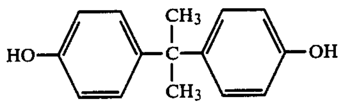

and 4-dimethylaminobenzaldehyde

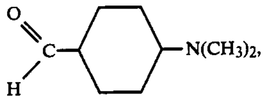

by polycondensation of bisphenol-A and para-anisaldehyde

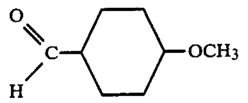

and by polycondensation of benzaldehyde and resorcinol, said polymer doped with a member of the group consisting of electron donors and electron acceptors to form the meltable polymer alloy of the defined conductivity of $10^{-14}$ through $10^{-7}$.

In accordance with an additional feature of the invention there is provided a method for producing a meltable polymer alloy which has a defined conductivity between $10^{-14}$ and $10^{-7}$ (ohm×cm)$^{-1}$, which comprises, forming a molecular mixture of at least one polar insulating polymer selected from the group consisting of polyvinyl chloride, polybutylene terephthalate, epoxy resin, polycarbonate, polyurethane resin and polyamide and a nonpolar conductive polymer selected from the group consisting of nonpolar copolymers of acetylene and copolymers of acetylene derivates doped with a member of the group consisting of electron donors and electron acceptors to form the meltable and soluble polymer alloy of the defined conductivity of $10^{-14}$ through $10^{-7}$, including admixing an additive which links the chains of the polar and the non-polar polymers.

Other features which are considered as characteristic for the invention are set forth in the appended claims.

Although the invention is illustrated and described herein as embodied in a method for producing a plastic, it is nevertheless not intended to be limited to the details shown, since various modifications may be made therein without departing from the spirit of the invention and within the scope and range of equivalents of the claims.

The invention, however, together with additional objects and advantages thereof will be best understood from the following description.

DETAILED DESCRIPTION OF THE INVENTION

According to the invention, the polymer alloy is formed by at least one polar or nonpolar electric insulating polymer and at least one polar or nonpolar electric conductive polymer. The polymer alloy is produced by mixing the polymer components forming the base material with each other in the liquid condition at a predeterminable temperature. The mixing takes place, depending on the starting materials used, during a heat treatment and preferably in a nitrogen atmosphere. The plastic so formed can be further processed immediately. If desired, the plastic may be made for interim storage to be used for further processing at a later time. Since the plastic according to the invention is soluble as well as meltable, subsequent later processing may be accomplished without difficulty. The plastic according to the invention can, for instance, be dissolved in a liquid organic solvent for forming a spraying varnish solution, such as acetone or a chlorinated hydrocarbon. The preferred ratio between solvent and plastic is a ratio of 2:1 to a ratio of 10:1.

The polymer alloy forming the plastic can contain as the insulating component, an organic polymer such as polyvinylchloride, terephthalate, an epoxy compound, polycarbonate, a polyurethane resin compound or polyamide. These polymers are, in particular, insulating polar polymers. Instead of these polymers, other organic polymers such as polyethylene, polybutadiene, polystyrene, butadiene styrene copolymers or acrylonitrile butadiene styrene copolymers and mixtures thereof can be used. These are insulating nonpolar polymers.

The second component used in the manufacture of the polymer alloy is a conductive polymer. Polymers, the conductivity of which is obtained by charge-transfer complexes are preferably used in the formation of the polymer alloy. The formation of these charge-transfer complexes is achieved by the addition of electron donors and/or electron acceptors in the manufacture or further processing of the polymers. A specific example therefor is a plastic which has triaromatic methane units as the basic building blocks and is doped with sulfur trioxide ($SO_3$). Instead of this plastic, a copolymer of acetylene or of acetylene derivatives can be used as the second component for manufacturing the polymer alloy.

Insulating polar or nonpolar polymers as well as conductive polar and nonpolar polymers can be used for forming the polymer alloy. If the manufacture is conducted using a first component which consists of an insulating nonpolar polymer while the second component is formed by a conductive polar polymer, then at least one additive which has the property of interlinking chains of nonpolar polymers with chains of polar polymers should be admixed to the polymer alloy during the manufacture.

According to the invention, an addition of 0.1 to 1% by weight, referred to the total amount of the polymer alloy, is admixed to the base material. Peroxide is used here as the preferred additive since thereby a C—C bond can be achieved between a polar and a nonpolar chain. Thereby, the trend of such different polymers diffusing apart is precluded. With the method according to the invention, polymer alloys can be prepared which, in the mixing ratio described at the outset between the two polymer components forming the polymer alloy have a conductivity which is $3\times10^{-9}(\text{ohm}\times\text{cm})^{-1}$. Thus, the conductivity of these polymer alloys is larger by about 5 powers of ten than that of the polymer components which are used for the preparation.

Plastics which are made of the polymer alloy according to the invention, can be further processed into foils. They are suitable for the casting of housings. Since the plastic according to the invention is not only meltable but also soluble, a spraying varnish solution can be prepared thereof if it is dissolved in acetone or a chlorinated hydrocarbon. With it, for instance, coatings on housings of electrical equipment can be made. A further field of application of this plastic is in the area of manufacturing records. The plastic is likewise suitable as packing material for integrated modules.

The following embodiment examples further illustrate manufacture of the conductive plastic according to the invention.

EXAMPLE I

In the following example, the manufacture of the plastic according to the invention in the form of a foil is described which has a conductivity of $3\times10^{-9}(\text{ohm}\times\text{cm})^{-1}$. Polyvinylchloride is used here as the polymer with insulating properties. The cohductive polymer used is one that has triaromatic methane units as the basic building blocks and which was doped with sulfur trioxide in its manufacture for forming charge transfer complexes. Conductive polymer of this type is described in published German Patent Application No. 32 48 088 and corresponding allowed U.S. application Ser. No. 563,871, filed Dec. 21, 1983 now U.S. Pat. No. 4,564,466. A foil of this plastic is made by dissolving 2 kg polyvinylchloride and 0.2 kg polytriaromatic methane doped with sulfur trioxide in a solvent. The solvent consists of 30 l tetrahydrofurane, 8 l acetone and 2 l ethanol.

Subsequently, the solution mixture is warmed and stirred at 35° C. for 0.5 hours. Thereupon, the liquid is filtered. Subsequently, the liquid is divided into several, for instance, 5 volumina, from which the solvent is evaporated After the evaporation, foils are developed which have a thickness of about 50 μm.

EXAMPLE 2

The preparation of a layer having a conductivity of $10^{-12}$(ohm×cm)$^{-1}$ is described. A liquid epoxy resin is used as the insulating polar polymer. The conductive polymer component consists of polytriaromatic methane which is doped with sulfurtrioxide for forming charge-transfer complexes. According to the invention, 1.3 kg epoxy resin and 70 g polytriaromatic methane doped with sulfur trioxide are mixed together in a nitrogen atmosphere at 50° C. After 20 minutes, the solid polytriaromatic methane is completely and homogeneously dissolved in the liquid epoxy resin. The resultant solution is designated solution A. Parallel to this solution A, a second solution B is started. For this purpose hardener provided for the epoxy resin and polytriaromatic methane doped with sulfur trioxide is used. 1 kg hardener and 50 g polytriaromatic methane doped with sulfur trioxide are used. The two substances are mixed together at 50° C. in a nitrogen atmosphere. Subsequently, both solutions A and B are mixed together while stirring at a temperature of 50° C. The newly obtained solution C is cast between two graphite electrodes. Subsequently, the polymer complex so formed is hardened at a temperature of 110° C. for a period of 8 hours. After the hardening, a layer was formed of the plastic which exhibits the conductivity described at the outset. This conductivity is higher by 6 powers of ten than that of the pure epoxy resin molding material.

EXAMPLE 3

Polybutylene terephthalate is used here as the insulating polar polymer for the preparation of the plastic. According to the invention, 10 kg polybutylene terephthalate and 0.5 kg polar polytriaromatic methane doped with sulfur trioxide are mixed together in a nitrogen atmosphere. The mixing of the polymers takes place at a temperature of 260° C. while the mixture is being stirred continuously. The plastic formed thereby has a conductivity of $10^{-11}$ (ohm×cm)$^{-1}$. This conductivity is 5 powers of ten higher than that of the pure polybutylene terephthalate.

EXAMPLE 4

The polymer alloy is formed by 2 kg of a nonpolar acetylene copolymer and 8 kg of a nonpolar polyethylene. Both starting products are present in the form of powder or granulate. The two polymer components are heated in a nitrogen atmosphere to 200° to 300° C. and mixed together by stirring. The solution so formed is subsequently cooled down. To reach the conductivity of the acetylene copolymer 1 kg iodine is added to the mixture. The iodine is added in a metallic autoclave, into which the polymer mixture was previously poured. The reaction with the iodine continues for about 2 hours. The plastic obtained has a conductivity of $10^{-10}$ (ohm×cm)$^{-1}$.

EXAMPLE 5

Polar polyvinylchloride and polar polytriaromatic methane doped with sulfur trioxide are used here for the preparation of plastics. To this end, 6 kg polyvinylchloride in the form of granulate are mixed with polytriaromatic methane doped with sulfur trioxide. Subsequently, this mixture is exposed to a temperature of 190° C. in a vacuum for 3 hours. A homogeneous melt is formed. The homogeneity is preserved in the finished plastic after cooling. The conductivity of this plastic is $10^{-9}$ (ohm×cm)$^{-1}$.

The foregoing is a description corresponding, in substance, to German application No. P 33 37 245.4, dated Oct. 13, 1983, international priority of which is being claimed for the instant application, and which is hereby made part of this application. Any material discrepancies between the foregoing specification and the specification of the aformentioned corresponding German application are to be resolved in favor of the later.

There is claimed:

1. Method for producing a meltable polymer alloy which has a defined conductivity between $10^{-14}$ through $10^{-7}$ (ohm×cm)$^{-1}$, which comprises, forming a molecular mixture of at least one polar insulating polymer selected from the group consisting of polyvinyl chloride, polybutylene terephthalate, epoxy resin, polycarbonate, polyurethane resin and polyamide and a polar conductive polymer in the form of a synthetic polymer with triaromatic methane units as basic building blocks, said polymer selected from the group consisting of a polymer formed by polycondensation of bisphenol-A,

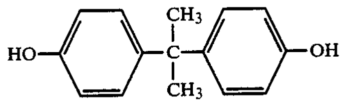

and 4-dimethylaminobenzaldehyde

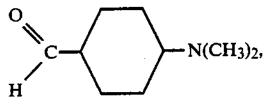

by polycondensation of bisphenol-A and para-anisaldehyde

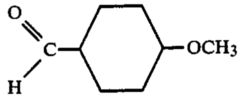

and by polycondensation of benzaldehyde and resorcinol, said polymer doped with a member of the group consisting of electron donors and electron acceptors to form the meltable and soluble polymer alloy of the defined conductivity of $10^{-14}$ through $10^{-7}$ (ohm×cm)$^{-1}$.

2. Method for producing a meltable polymer alloy which has a defined conductivity between $10^{-14}$ and $10^{-7}$ (ohm×cm)$^{-1}$, which comprises, forming a molecular mixture of at least one nonpolar insulating polymer selected from the group consisting of polyethylene, polybutadiene, polystyrene, butadiene styrene copolymers and acrylonitrile butadiene styrene copolymers and a polar conductive polymer in the form of a synthetic polymer with triaromatic methane units as basic building blocks, said polymer selected from the group consisting of a polymer formed by polycondensation of bisphenol-A,

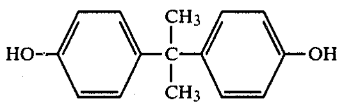

and 4-dimethylaminobenzaldehyde

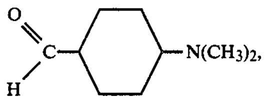

by polycondensation of bisphenol-A and para-anisaldehyde

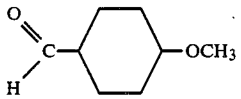

and by polycondensation of benzaldehyde and resorcinol, polymers doped with a member of the group consisting of electron donors and electron acceptors to form the meltable and soluble polymer alloy of the defined conductivity of $10^{-14}$ through $10^{-7}$.

3. Method according to claim 1, wherein the insulating and conductive polymers are mixed with each other in a molten state and at a temperature which lies near their melting temperatures, and the resultant polymer alloy is immediately processed or hardened for intermediate storage.

4. Method according to claim 2, wherein the insulating and conductive polymers are mixed with each other in a molten state and at a temperature which lies near their melting temperatures, and the resultant polymer alloy is immediately processed or hardened for intermediate storage.

5. Method according to claim 1, wherein in forming the polymer alloy, 5 to 10% by weight of the conductive polymer is used, based on the total weight of the polymer mixture, and the remainder is the insulating polymer.

6. Method according to claim 2, wherein in forming the polymer alloy, 5 to 10% by weight of the conductive polymer is used, based on the total weight of the polymer mixture, and the remainder is the insulating polymer.

7. Method according to claim 2, including admixing an additive which links the chains of polar and non-polar polymers.

8. Method according to claim 7, wherein peroxide as an additive is admixed to the polymer alloy.

* * * * *